No. 852,276. PATENTED APR. 30, 1907.
L. W. KERSHAW.
JOINT PLATE.
APPLICATION FILED JUNE 11, 1906.

2 SHEETS—SHEET 1.

Witnesses:
Dennis Sumby
C. D. Kesler

Inventor
Louis W. Kershaw
By James L. Norris
Atty

No. 852,276. PATENTED APR. 30, 1907.
L. W. KERSHAW.
JOINT PLATE.
APPLICATION FILED JUNE 11, 1906.
2 SHEETS—SHEET 2.
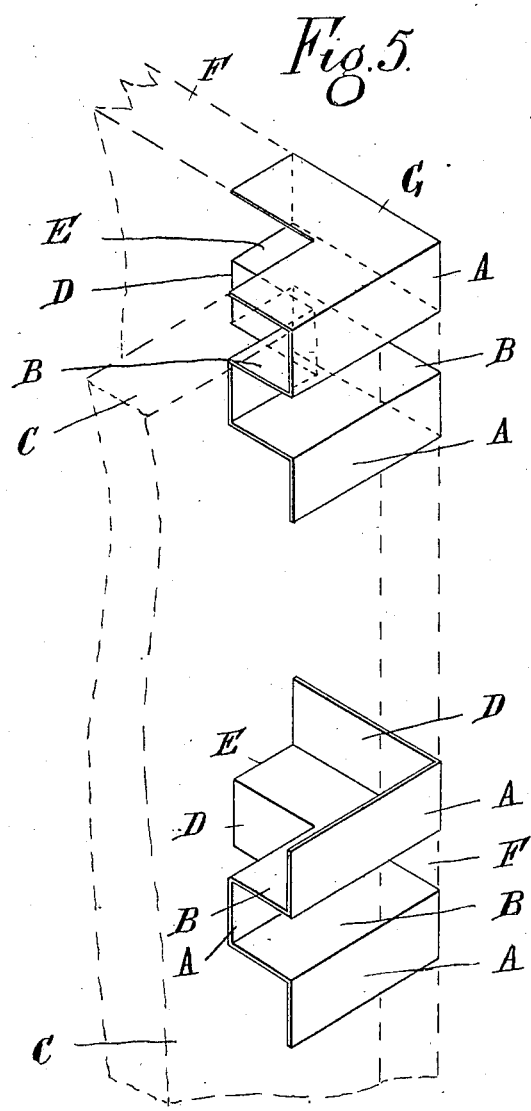

UNITED STATES PATENT OFFICE.

LOUIS WALTER KERSHAW, OF WAKEFIELD, ENGLAND, ASSIGNOR TO E. GREEN AND SON LIMITED, OF WAKEFIELD, ENGLAND, A CORPORATION.

JOINT-PLATE.

No. 852,276.      Specification of Letters Patent.      Patented April 30, 1907.

Application filed June 11, 1906. Serial No. 321,279.

*To all whom it may concern.*

Be it known that I, LOUIS WALTER KERSHAW, a subject of the King of Great Britain, residing at 3 Arundel street, Wakefield, Yorkshire, England, have invented certain new and useful Improvements in Joint-Plates, of which the following is a specification.

The object of this invention is to construct an appliance for securing the edges of wooden and like boxes or cases together, without the aid of nails, screws or like fastening devices.

My invention will be clearly understood from the following description aided by the examples shown on the annexed drawings.

Figure 1:
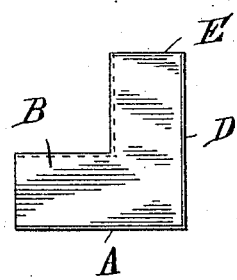
Figure 3:
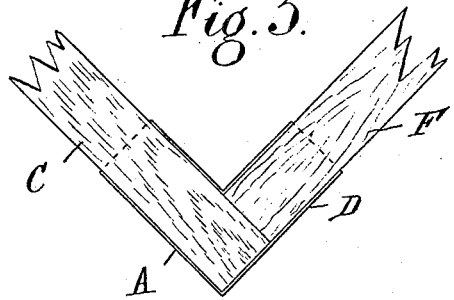
Figure 2:
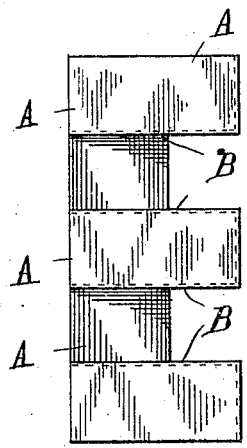
Figure 4:
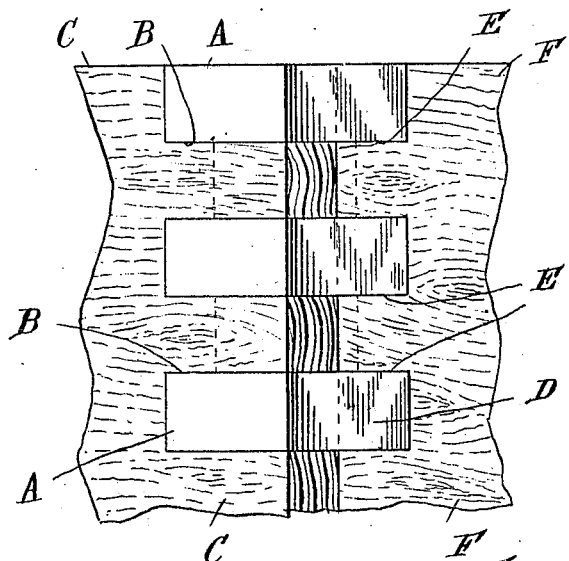

Figure 1. is a top view and Fig. 2 a side view of one form of the device. Fig. 3. is a top view of the device showing its application to a box corner. Fig. 4. is an elevation of the corner of a box with the device applied. Fig. 5. is a perspective elevation of a box corner shown in dotted lines, with two devices shown applied in full lines.

For the purpose of my invention, I form the fastening device (Figs. 2 or 5) of L shape, each leg of the L being of corrugated, wavy or equivalent formation across the length of the leg. The corrugated or like members A B forming one leg of the device are driven into the edge of the piece or pieces of wood C forming one side of the box, the members B going with the grain and with the side members A alternately situate outside and close to the sides of the wood C, and then the members E of the other leg of the device are driven into the edge of the piece or pieces of wood F forming the next side or end of the box, the members E also going with the grain and with the side members D arranged as before, each connecting ends of the wood having a device similarly applied, the members gripping the wood in such a manner as to form an efficient joint therefor.

The device is preferably made of tinned sheet iron and can be made so as to extend the whole length of the box corner or be fitted in sections as at Fig. 5, and by thus connecting the corners of boxes, a stronger joint is produced than by means of nails or dovetailing, battens will not be needed, and the time of manufacture will be reduced.

Where several devices are employed for connecting the edge of the box sides and ends they may be made with any number of corrugations, as at Figs. 4 and 5 and where the devices are employed for the top and bottom of the corner of the box, they may have a member such as G Fig. 5, to protect the outer edges, and such member may be hammered into the edge of the box to grip it.

The members B may be at different angles to each other so as to form an efficient grip for heavy boxes, and the corrugations may be round, or of a shape other than that shown on the drawings and either for the whole or a portion of their length.

What I claim and desire to secure by Letters Patent is:—

1. A joint plate comprising a substantially angular corrugated body, the axes of the corrugations being parallel with the angular contour of the body.

2. A joint plate comprising a substantially angular body having a continuous channel parallel with the angular contour of said body, the latter being provided with oppositely extended flanges on its open side.

3. A joint plate comprising a substantially angular body having a continuous channel parallel with the angular contour of said body, the latter being provided with opposite flanges extending the complete length thereof on its open side.

4. A joint plate comprising a substantially angular body having a continuous channel and oppositely extending angular flanges, the said channel and flanges being parallel with the angular contour of the body.

5. A joint plate comprising a substantially angular body open at its opposite ends and having a continuous channel parallel with the angular contour of said body, the latter being provided with opposite flanges on its open side extending uninterruptedly from one open end to the other.

In testimony whereof I have hereunto set my hand in the presence of two subscribing witnesses:

LOUIS WALTER KERSHAW.

Witnesses:
    W. B. GREENER,
    H. KENYON.